United States Patent [19]

Wagner

[11] 4,292,935
[45] Oct. 6, 1981

[54] LOW NITROUS OXIDE (NOX) PRECOMBUSTOR

[75] Inventor: William R. Wagner, Los Angeles, Calif.

[73] Assignee: Rockwell International Corporation, El Segundo, Calif.

[21] Appl. No.: 136,140

[22] Filed: Mar. 31, 1980

[51] Int. Cl.$^3$ .............................................. F02B 19/14
[52] U.S. Cl. .................................. 123/285; 123/286; 123/275; 123/282
[58] Field of Search ............... 123/253, 254, 280, 281, 123/282, 283, 285, 886, 275

[56] References Cited

U.S. PATENT DOCUMENTS

| | | | |
|---|---|---|---|
| 1,413,466 | 4/1922 | Gaertner | 123/253 |
| 1,464,906 | 8/1923 | Heutschke | 123/254 |
| 1,477,984 | 12/1923 | Suter | 123/254 |
| 1,525,776 | 2/1925 | French | 123/286 |
| 2,067,274 | 1/1937 | L'Orange | 123/253 |
| 4,122,804 | 10/1978 | Kingsbury et al. | 123/275 |

FOREIGN PATENT DOCUMENTS

| | | | |
|---|---|---|---|
| 552745 | 5/1923 | France | 123/285 |
| 764651 | 12/1956 | United Kingdom | 123/275 |

*Primary Examiner*—P. S. Lall
*Attorney, Agent, or Firm*—H. F. Hamann; Harry B. Field

[57] ABSTRACT

A geometrically optimized precombustion chamber 12 for a diesel or stratified charge engine is provided which limits the maximum gas temperature through transonic and/or supersonic flow to prevent the production of nitrous oxides and is defined in accordance with the following equation:

$$\left(\frac{dT}{T}\right) = \frac{(\gamma - 1) M^2}{1 - M^2} \left(\frac{dA}{A}\right) + \frac{(1 - \gamma M^2)\left(1 + \frac{\gamma - 1}{2} M^2\right)}{(1 - M^2)} \left(\frac{dT_o}{T_o}\right)$$

5 Claims, 2 Drawing Figures

LOW NITROUS OXIDE (NOX) PRECOMBUSTOR

BACKGROUND OF THE INVENTION

1. Field of the Invention

The present invention pertains to diesel engines of the type having precombustion chambers, and more specifically, to improvements in those precombustion chambers which will permit greater efficiency.

2. Description of the Prior Art

Diesel engines designed according to the precombustion chamber system have the combustion chamber divided into a precombustion chamber, which is incorporated into the cylinder head, and a main combustion chamber which is positioned between the bottom edge of the cylinder head and the heads of the piston or crown. The precombustion chamber into which the fuel is injected and in which only a partial combustion takes place, is connected to the main combustion chamber by means of a narrow slot or flow passage.

In operation, as the piston moves in the direction of the cylinder head air is forced into the precombustion chamber and at the end of this compression stroke, fuel is injected into the precombustion chamber. Subsequently, a flame front is propagated down a flow channel from the precombustion chamber into a secondary combustion chamber formed in the piston head. The combustion of this fuel-air combination generates the thrust necessary to produce the power stroke of the piston.

It should be noted that the precombustion chamber, as well as the flow passages of the prior art, have significantly different geometries than the present invention. In U.S. Pat. No. 4,122,804 to Kingsbury et al, precombustion chamber 50 is almost spherical in shape instead of having the elongated cylindrical geometry of the presently claimed combustion chamber. Furthermore, it should be noted that flow passage 72 has acute angles in it as well as sharp-edged orifices where the flow passage interconnects with the precombustion chamber. This basic simplistic design of the precombustion chamber and flow passage yields inherent efficiency problems as well as inherent problems of incomplete combustion.

SUMMARY OF THE INVENTION

In accordance with the present invention, there is described a precombustor for diesel engines wherein the internal geometry of the precombustion chamber is defined in accordance with the following equation:

$$\left(\frac{dT}{T}\right) = \frac{(\gamma-1)M^2}{1-M^2}\left(\frac{dA}{A}\right) + \frac{(1-\gamma M^2)\left(1+\frac{\gamma-1}{2}M^2\right)}{(1-M^2)}\left(\frac{dT_o}{T_o}\right)$$

wherein T is the static temperature and dT/T approaches zero, $\gamma$ is the ratio of specific heats of combustion gases and lies in the range of from about 1.1 to about 1.4, A is the area of the precombustion chamber at any specific distance from the head end of the precombustion chamber, M is the mach number of the gas flow, and $T_o$ is the total temperature of the reacted gases.

OBJECTS OF THE INVENTION

Therefore, it is an object of the present invention to provide a highly efficient diesel engine.

Yet another object of the present invention is to provide a diesel engine which decreases the production of nitrous oxides.

Another object of the present invention is to provide a diesel engine which burns fuel more completely.

Still another object of the present invention is to provide a diesel engine whose particulate matter output is significantly increased.

A further object of the present invention is to provide a precombustion chamber wherein the fuel is axially injected into the precombustion chamber.

Still a further object of the present invention is to provide the combustion chamber with a supersonic DeLaval nozzle.

Yet another object of the present invention is to provide a flow passage with a subsonic DeLaval diffuser.

Another object of the present invention is to provide a precombustion chamber capable of generating normal shock waves which impinge upon fuel droplets, thereby atomizing the fuel droplets.

Other objects, advantages and novel features of the present invention will become apparent from the following detailed description of the invention when considered in conjunction with the accompanying drawings.

DESCRIPTION OF THE PREFERRED EMBODIMENTS

Figure 1:
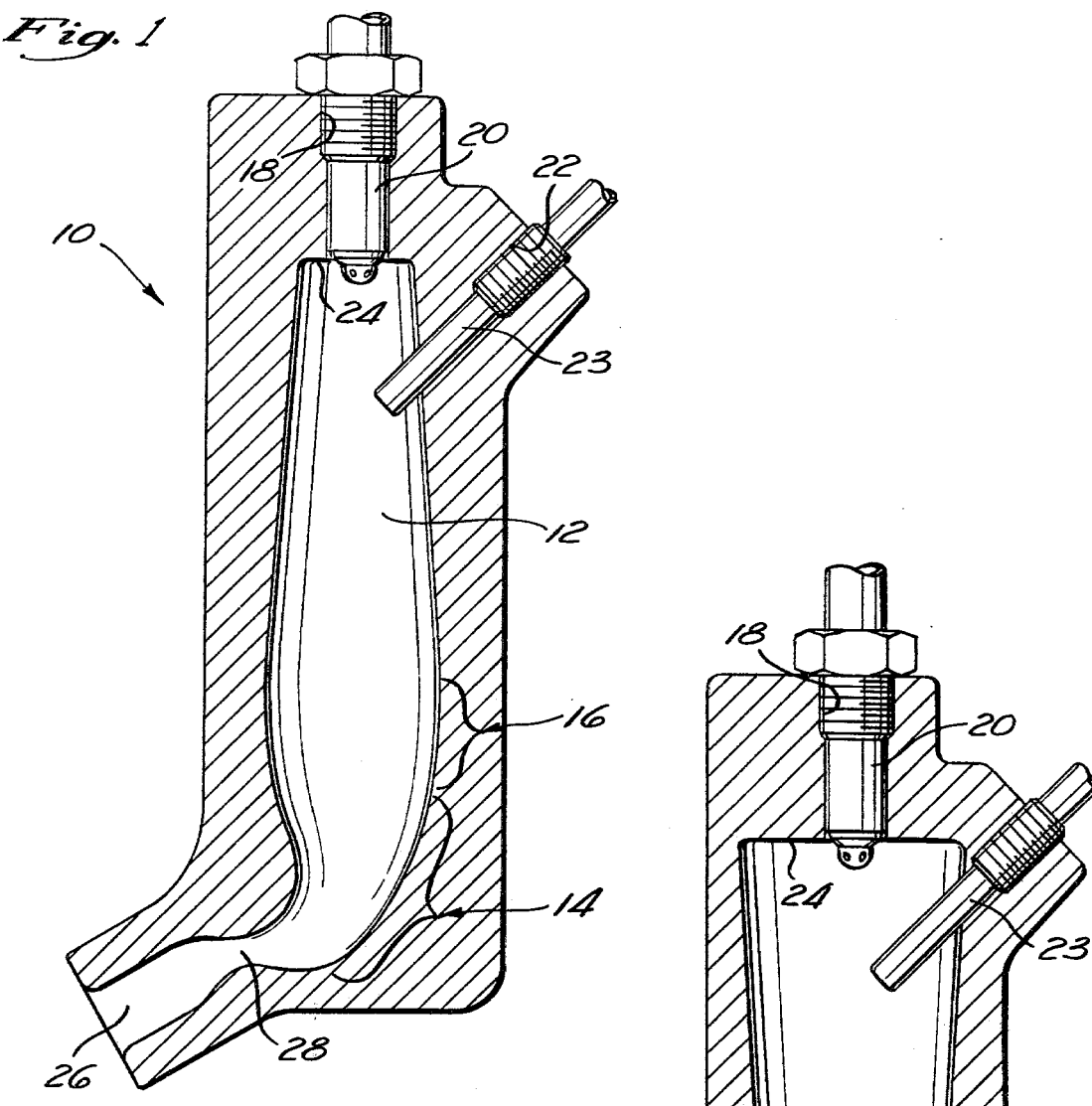
FIG. 1 is a schematic cross-sectional view of a supersonic isothermal combustion diesel precombustor.

In accordance with the present invention, there is provided a precombustor generally designated 10 which comprises a precombustion chamber 12 having a supersonic DeLaval nozzle generally designated 14 having an axisymmetric supersonic diffuser generally designated 16, a fuel spray nozzle port 18 through which a fuel spray nozzle 20 may be inserted, and igniter port 22 adjacent to said fuel spray nozzle port 18 for receiving the means for igniting a fuel-air mixture such as a glow plug 23.

The geometric shape of the precombustion chamber 12 can be controlled so as to cause local combustion gas temperature static values to be reduced, for near sonic and supersonic flow speeds. This geometry will allow the combustion to proceed at a lower static temperature (T) level which, in turn, will cause a reduction in nitrogen oxide formation due to the lower overall dissociation and reaction level occurring. The basic equations occurring for a one-dimensional flow can be developed based on a temperature (T) expression as follows:

$$\left(\frac{dT}{T}\right) = \frac{(\gamma-1)M^2}{1-M^2}\left(\frac{dA}{A}\right) + \frac{(1-\gamma M^2)\left(1+\frac{\gamma-1}{2}M^2\right)}{(1-M^2)}\left(\frac{dT_o}{T_o}\right)$$

wherein T is the static temperature, $\gamma$ is the ratio of specific heats of combustion gases as defined by the $$\text{ratio of } \frac{\text{constant pressure heat capacity}}{\text{constant volume heat capacity}},$$

A is the cross-sectional area of the precombustion chamber 12 at any given distance from the head end 24 of the precombustion chamber 12, M is the mach number of the gas flow, and $T_o$ is the total temperature of the reaction gases. In the preferred operating conditions, $\gamma$ should be between about 1.1 and about 1.4 and dT/T should approach zero.

Figure 2:
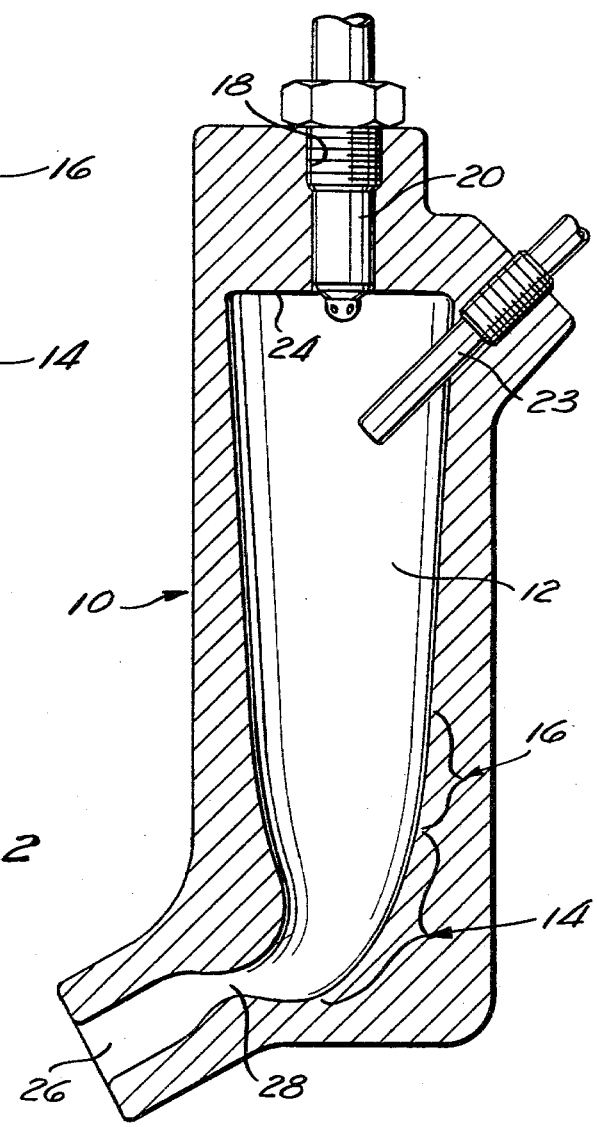
FIG. 2 is a schematic cross-sectional view of a subsonic isothermal combustion diesel precombustor.

It can be seen that for maintaining small temperature rises dT/T→0 for a choked flow or a supersonic flow M≧1.0 the cross-sectional area of the precombustion chamber 12 should increase ($\theta$+) as the distance from the head end 14 of precombustion chamber 12 increases and as combustion proceeds down chamber 12 (FIG. 1). For subsonic flow M≦1.0, the cross-sectional area of the precombustion chamber 12 should decrease ($\theta$−) as the distance from the head end 24 of the chamber 12 increases. By varying the cross-sectional area of the precombustion chamber 12 in this manner, the peak temperature can be held below about 2500° R. which is the critical temperature above which nitrous oxides are produced. In cases where a high velocity head is involved the use of a diffuser section 26 as shown in FIGS. 1 and 2 can be used on the nozzle 14. For subsonic (FIG. 2) incoming flow, the inlet 26 to the throat 28 is contoured as is the nozzle 14 to preclude flow dynamic pressure head losses.

It should be noted that the precombustion chamber 12 of the present invention can be enhanced by incorporating the converging/diverging nozzle and the length-over-diameter ratio as defined in copending patent application, Ser. No. 135,389 filed Mar. 31, 1980 entitled "Atomizing Shock Wave Precombustor" to William R. Wagner and the finned precombustor insert of the copending patent application, Ser. No. 136,139 filed Mar. 31, 1980 entitled "Finned Precombustor Insert for Diesel Engines" to William R. Wagner, both of which are included herein by reference.

Thus, what has been described is an aerodynamic shaping in the new sonic and supersonic regions of the precombustor to minimize the gas static temperature rise to preclude a high temperature situation which is undesirably conducive to nitrous oxide formation.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A precombustor for use in diesel engines, wherein the improvement comprises defining the internal geometry of the precombustion chamber in accordance with the following equation:

$$\left(\frac{dT}{T}\right) = \frac{(\gamma - 1) M^2}{1 - M^2} \left(\frac{dA}{A}\right) + \frac{(1 - \gamma M^2)\left(1 + \frac{\gamma - 1}{2} M^2\right)}{(1 - M^2)} \left(\frac{dT_o}{T_o}\right)$$

where T is static temperature, A is area of precombustion chamber, $\gamma$ is ratio of specific heats, and M is mach number of the gas flow.

2. The precombustion chamber of claim 1 wherein dT/T approaches zero.

3. The precombustion chamber of claim 1 wherein $\gamma$ lies between about 1.1 and about 1.4.

4. The precombustion chamber of claim 1 further comprising a converging/diverging nozzle for controlling gas flow into and out of said precombustion chamber.

5. The precombustion chamber of claim 1 wherein said precombustor is a finned precombustor insert.

* * * * *